United States Patent
Wang

(10) Patent No.: US 10,309,504 B2
(45) Date of Patent: Jun. 4, 2019

(54) RECIPROCATING LINEAR PUSHROD

(71) Applicant: TIMOTION TECHNOLOGY CO., LTD., New Taipei (TW)

(72) Inventor: Chun-Tu Wang, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 284 days.

(21) Appl. No.: 15/441,231

(22) Filed: Feb. 23, 2017

(65) Prior Publication Data
US 2018/0202526 A1 Jul. 19, 2018

(30) Foreign Application Priority Data

Jan. 13, 2017 (TW) .............................. 106200614 U

(51) Int. Cl.
*F16H 25/24* (2006.01)
*F16H 25/18* (2006.01)
*F16H 25/20* (2006.01)
*F16H 1/20* (2006.01)

(52) U.S. Cl.
CPC ........... *F16H 25/24* (2013.01); *F16H 25/186* (2013.01); *F16H 1/203* (2013.01); *F16H 2025/209* (2013.01); *F16H 2025/2081* (2013.01)

(58) Field of Classification Search
CPC .. F16H 25/24; F16H 1/203; F16H 2025/2081; F16H 2025/209
See application file for complete search history.

(56) References Cited

U.S. PATENT DOCUMENTS

| | | | | |
|---|---|---|---|---|
| 2,550,721 A | * | 5/1951 | Ritter | F16C 19/00 74/424.92 |
| 3,608,612 A | * | 9/1971 | Pemberton | E05F 15/673 160/188 |
| 3,768,745 A | * | 10/1973 | Koller | B65H 54/2812 242/483.5 |
| 3,779,094 A | * | 12/1973 | La Barre | F16H 25/122 74/25 |
| 4,022,076 A | * | 5/1977 | Metz | F16H 25/22 74/441 |
| 4,031,765 A | * | 6/1977 | Metz | F16H 25/122 74/57 |

(Continued)

*Primary Examiner* — Zakaria Elahmadi
(74) *Attorney, Agent, or Firm* — Chun-Ming Shih; HDLS IPR Services

(57) ABSTRACT

A reciprocating linear pushrod includes a base, a transmission mechanism and a moving mechanism. The transmission mechanism includes a motor and a rotary shaft, and the rotary shaft has a threaded portion including a left-handed thread groove and a right-handed thread groove crossed with each other, and both ends of the left-handed thread groove are communicated to both ends of the right-handed thread groove respectively. The moving mechanism includes a moving rod and a crescent member, and the moving rod has an axial hole and a radial hole and is sheathed on the rotary shaft by the axial hole, and the crescent member is accommodated in the radial hole and embedded into the threaded portion, so that the moving mechanism can be moved reciprocally according to the rotation of the rotary shaft, and this disclosure has the effects of reducing the total volume and simplifying the structure significantly.

8 Claims, 9 Drawing Sheets

(56) References Cited

U.S. PATENT DOCUMENTS

| | | | | | |
|---|---|---|---|---|---|
| 4,309,740 | A * | 1/1982 | Takata | ............... | B60C 1/068 362/532 |
| 4,343,200 | A * | 8/1982 | Alworth | ............... | F16H 25/122 74/424.89 |
| 4,730,503 | A * | 3/1988 | Rosenthal | ............... | F16H 25/20 74/424.72 |
| 4,774,822 | A * | 10/1988 | Brenner | ............... | D06F 13/02 68/133 |
| 5,198,946 | A * | 3/1993 | Kurosawa | ............... | G11B 5/5521 360/267.4 |
| 5,299,649 | A * | 4/1994 | Sano | ............... | B62D 5/0448 180/400 |
| 5,390,585 | A * | 2/1995 | Ryuh | ............... | F16H 25/122 417/534 |
| 5,540,113 | A * | 7/1996 | Takei | ............... | F16H 25/2018 74/424.75 |
| 5,647,245 | A * | 7/1997 | Takei | ............... | F16H 25/2018 74/89.3 |
| 5,765,668 | A * | 6/1998 | Hasselberg | ............... | F16H 25/20 188/134 |
| 5,809,833 | A * | 9/1998 | Newport | ............... | F16H 25/20 192/141 |
| 5,988,328 | A * | 11/1999 | Newport | ............... | F16D 49/16 188/166 |
| 6,058,098 | A * | 5/2000 | Kato | ............... | G11B 7/08582 369/223 |
| 6,244,228 | B1 * | 6/2001 | Kuhn | ............... | F01L 1/00 123/90.1 |
| 7,007,566 | B2 * | 3/2006 | Norum | ............... | F16H 61/32 74/335 |
| 7,963,529 | B2 * | 6/2011 | Oteman | ............... | B60G 13/001 188/266 |
| 8,794,086 | B2 * | 8/2014 | Wu | ............... | F16H 25/2021 74/89.23 |
| 8,967,006 | B2 * | 3/2015 | Pettersson | ............... | A47B 9/04 74/424.95 |
| 9,254,145 | B2 * | 2/2016 | Teeslink | ............... | A61B 17/320783 |
| 9,312,738 | B2 * | 4/2016 | Winther | ............... | F16H 25/20 |
| 2008/0041181 | A1 * | 2/2008 | Mueller | ............... | F16H 61/32 74/473.12 |
| 2008/0289442 | A1 * | 11/2008 | Kawada | ............... | F16H 25/20 74/473.12 |
| 2010/0064438 | A1 * | 3/2010 | Knudsen | ............... | A61G 7/012 5/611 |
| 2010/0139429 | A1 * | 6/2010 | Ku | ............... | B66F 3/08 74/89.37 |
| 2012/0227524 | A1 * | 9/2012 | Takahashi | ............... | F16H 25/2015 74/89.34 |
| 2012/0255380 | A1 * | 10/2012 | Wu | ............... | B65H 75/4407 74/89.37 |
| 2013/0008270 | A1 * | 1/2013 | Giovannone | ............... | B66F 3/18 74/89.37 |
| 2013/0174678 | A1 * | 7/2013 | Fukushima | ............... | F16H 57/0497 74/89.23 |
| 2013/0305857 | A1 * | 11/2013 | Heeg | ............... | B60N 2/0224 74/89.23 |
| 2014/0123789 | A1 * | 5/2014 | Saunders | ............... | F16H 25/12 74/89.23 |
| 2014/0157921 | A1 * | 6/2014 | Wu | ............... | F16H 25/20 74/89.32 |
| 2014/0230586 | A1 * | 8/2014 | Saxstetter | ............... | F16H 55/0806 74/89.23 |
| 2014/0260730 | A1 * | 9/2014 | Wu | ............... | F16H 25/20 74/89.23 |
| 2015/0300464 | A1 * | 10/2015 | Sugahara | ............... | F16H 19/0672 74/89.2 |
| 2015/0308549 | A1 * | 10/2015 | Hirai | ............... | F16H 25/205 74/89.29 |
| 2016/0010731 | A1 * | 1/2016 | Stensgaard | ............... | F16D 28/00 74/89.35 |
| 2016/0108911 | A1 * | 4/2016 | Sprocq | ............... | F04C 2/084 418/205 |
| 2016/0120677 | A1 * | 5/2016 | Heanue | ............... | A61F 2/966 623/1.12 |
| 2016/0312867 | A1 * | 10/2016 | Larson | ............... | F16H 25/205 |

\* cited by examiner

RECIPROCATING LINEAR PUSHROD

FIELD OF THE INVENTION

This disclosure relates to the technology of linear pushrods, and more particularly to a reciprocating linear pushrod.

BACKGROUND OF THE INVENTION

A driver is commonly and extensively used for adjusting or changing the high/low position, and left/right direction in the areas such as mobile billboards, electric curtains, or windshield wipers, etc. As to the advertising billboards, most of them use a motor to drive a four-link-rod module, and each swing arm is coupled to the four-link-rod module, so that each swing arm can be moved back and forth continuously to provide various different r However, the aforementioned four-link-rod module not just comes with a large volume only, but also has a complicated structure. Therefore, its installation process or maintenance and repair are very cumbersome and inconvenient.

In view of the aforementioned drawbacks of the prior art, the discloser of this disclosure conducted extensive research and provided a feasible design to overcome the drawbacks of the prior art.

SUMMARY OF THE INVENTION

Therefore, it is a primary objective of the present invention to provide a reciprocating linear pushrod capable of reducing the total volume and simplifying the structure by a special configuration of components.

To achieve the aforementioned and other objectives, this disclosure provides a reciprocating linear pushrod comprising a base, a transmission mechanism and a moving mechanism, and the transmission mechanism includes a motor fixed to and supported by the base and supported by the base for driving a rotary shaft, and the rotary shaft has a threaded portion, and the threaded portion includes a left-handed thread groove and a right-handed thread groove crossed with each other, and both ends of the left-handed thread groove are communicated to both ends of the right-handed thread groove respectively. The moving mechanism includes a moving rod and a crescent member, and the moving rod has an axial hole and a radial hole communicated to the axial hole, and the moving rod is sheathed on the rotary shaft through the axial hole, and the crescent member is accommodated in the radial hole and embedded into the threaded portion, so that the moving mechanism can be moved reciprocally according to the rotation of the rotary shaft.

This disclosure has the following effects: The threaded portion of the rotary shaft works together with the moving mechanism, so that the motor just needs to rotate in a single direction to drive the moving mechanism to move reciprocally, so as to improve transmission performance and extend service life. With the configuration of the sleeve, the ball, and the crescent member, the moving rod can be moved more stably and smoothly. By sealing the electrical components into the base, the electrical components can be protected from being damaged by moisture. The adapter plate and the front bearing are provided for supporting the mid section of the rotary shaft, so as to assure the operation stability of the rotary shaft. Since the motor rotating in a single direction is adopted, the component cost can be saved appropriately, and the motor needs not to be rotated in both forward and reverse directions, and thus this disclosure can prevent the occurrence of noises effectively.

DESCRIPTION OF THE PREFERRED EMBODIMENTS

Figure 1:
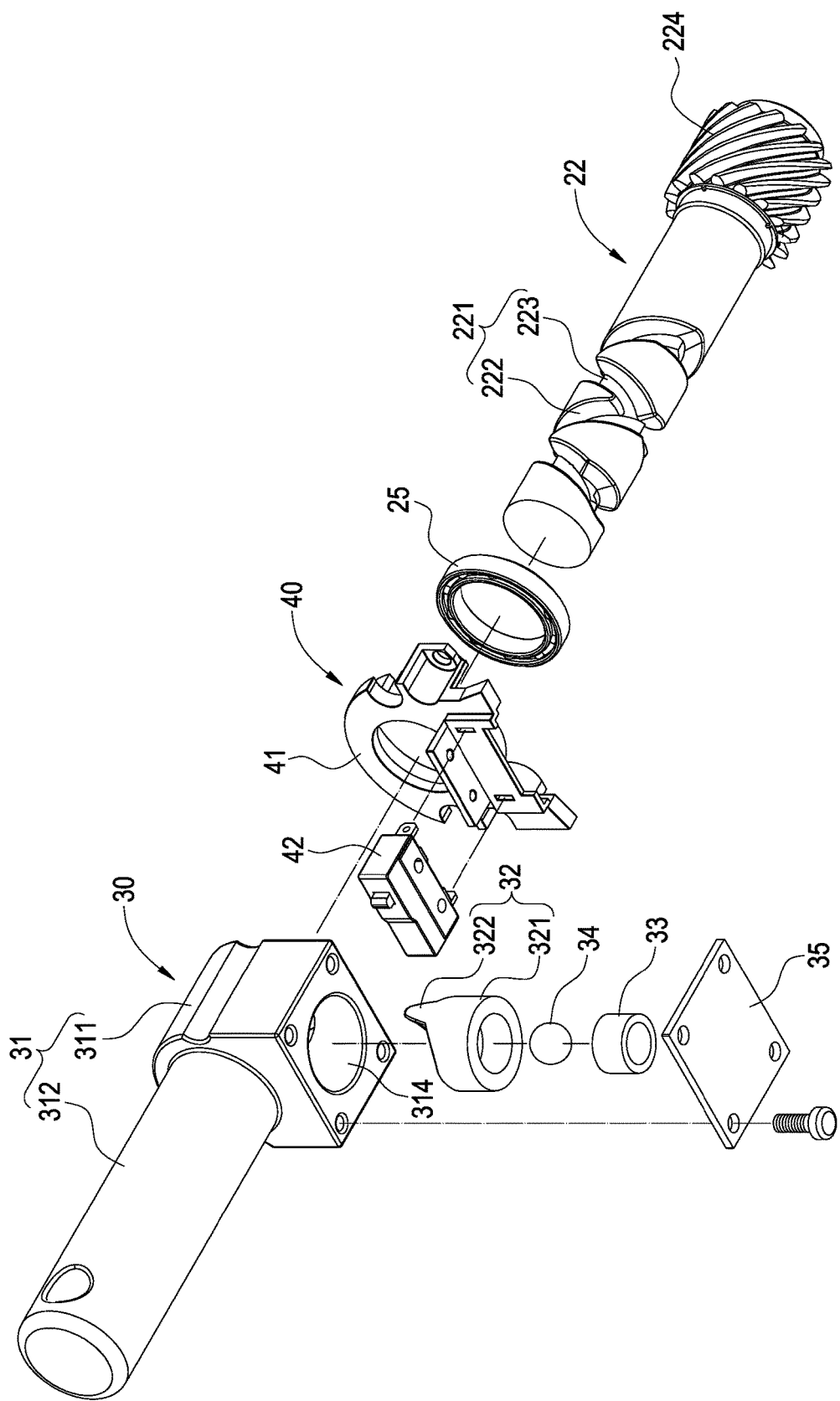
FIG. 1 is an exploded view of a reciprocating linear pushrod of this disclosure.
Figure 2:
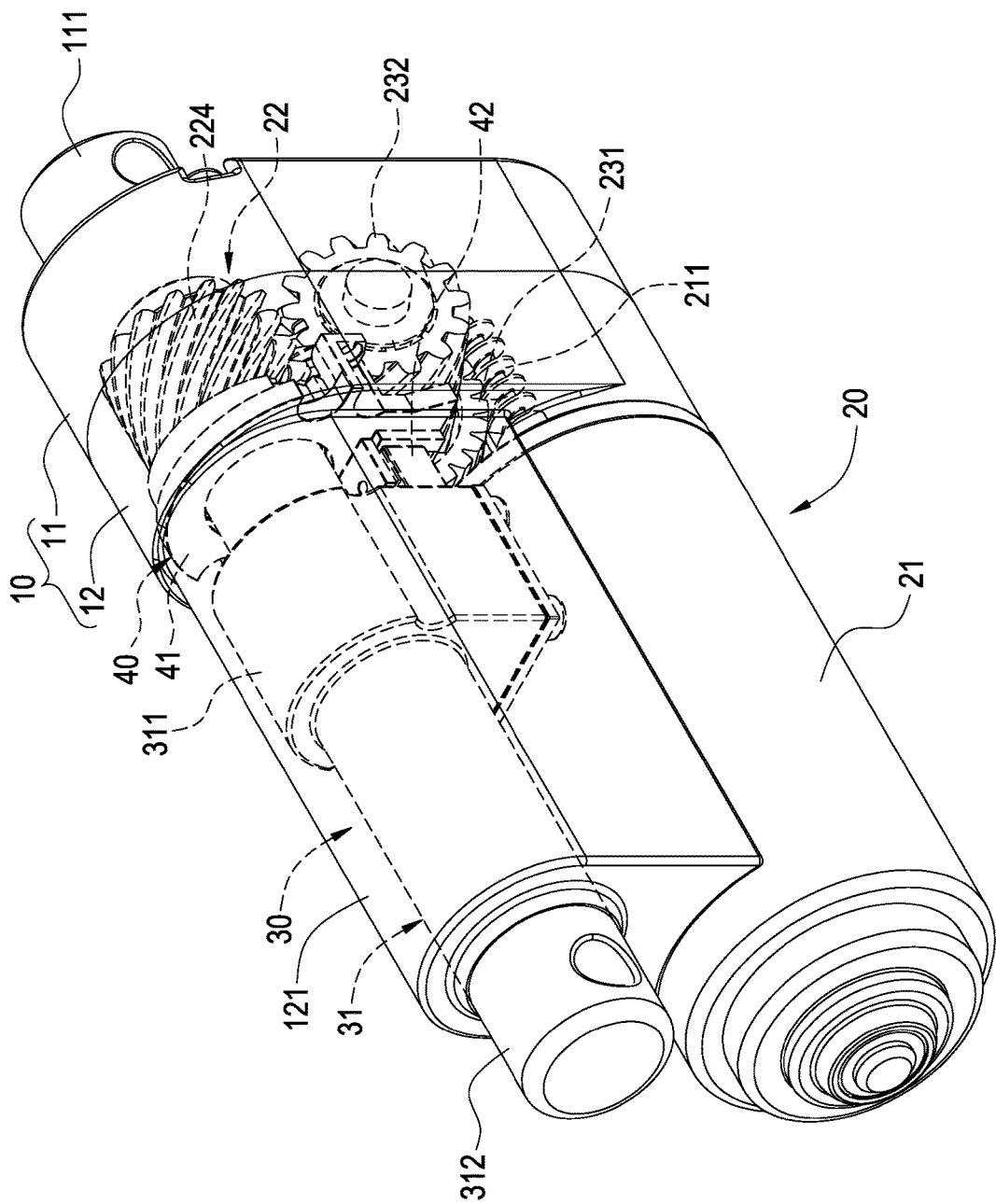
FIG. 2 is a perspective view of a reciprocating linear pushrod of this disclosure.
Figure 3:
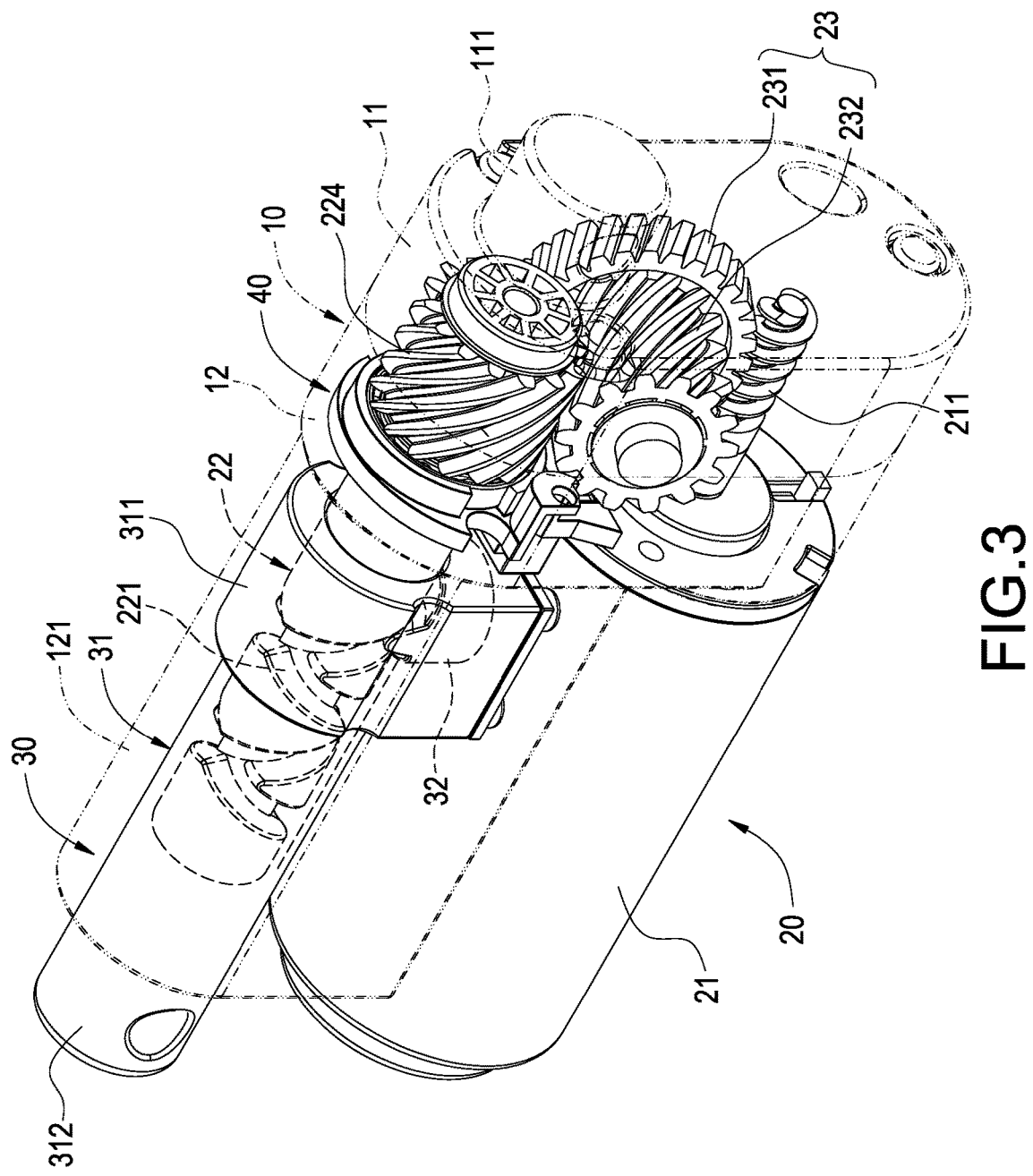
FIG. 3 is another perspective view of a reciprocating linear pushrod of this disclosure.
Figure 4:
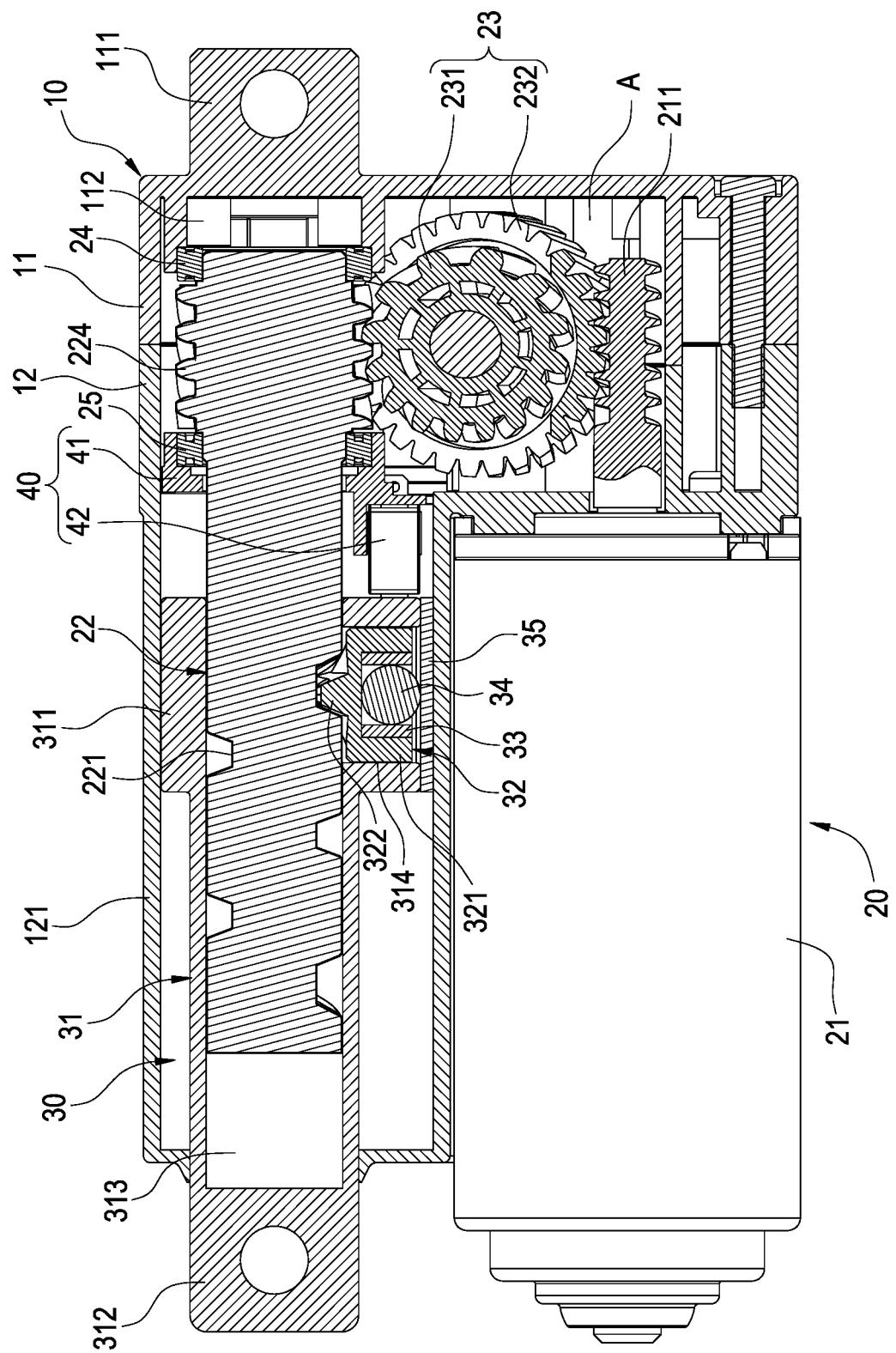
FIG. 4 is a cross-sectional view of a reciprocating linear pushrod of this disclosure.

The technical contents of the present invention will become apparent with the detailed description of preferred embodiments accompanied with the illustration of related drawings as follows. It is noteworthy that the preferred embodiments are provided for illustrating this disclosure rather than restricting the scope of the disclosure.

With reference to FIGS. 1 to 4 for a reciprocating linear pushrod of this disclosure, the reciprocating linear pushrod comprises a base 10, a transmission mechanism 20 and a moving mechanism 30.

The base 10 comprises a rear casing 11, a front casing 12 engaged with the rear casing 11, an accommodating chamber A formed between the front casing 12 and the rear casing 11, and a supporting seat 111 and a bearing seat 112 disposed at an upper portion of the rear casing 11, and the supporting seat 111 is formed on the exterior of the rear casing 11, and the bearing seat 112 is formed in the accommodating chamber A and disposed at the center of the supporting seat 111, and the front casing 12 has a hollow tube 121 extended from a side away from the rear casing 11.

The transmission mechanism 20 comprises a motor 21, a rotary shaft 22 and a gearset 23, and the motor 21 is fixed to the lower side of the front casing 12 and arranged parallel to the hollow tube 121, and the motor 21 has a worm 211 extended into the accommodating chamber A, and an end of the rotary shaft 22 is supported by the bearing seat 112 through a rear bearing 24. The rotary shaft 22 has a threaded portion 221 and a first worm gear 224, and the first worm gear 224 is formed in the rear section of the rotary shaft 22, and the threaded portion 221 is formed in the mid to front section of the rotary shaft 22, and the threaded portion 221 includes a left-handed thread groove 222 and a right-handed thread groove 223 crossed with the left-handed thread groove, and the front and rear ends of the left-handed thread groove 222 are communicated to the rear and front ends of the right-handed thread groove 223 respectively, and the left-handed thread groove 222 and the right-handed thread groove 223 have same pitch and tooth width and opposite directions. In this preferred embodiment, the gearset 23 is installed between the worm 211 and the first worm gear 224 and comprises a worm wheel 231 engaged and transmitted with the worm 211, coupled to the worm wheel 231, and a second worm gear 232 engaged and transmitted with the first worm gear 224.

Figure 9:
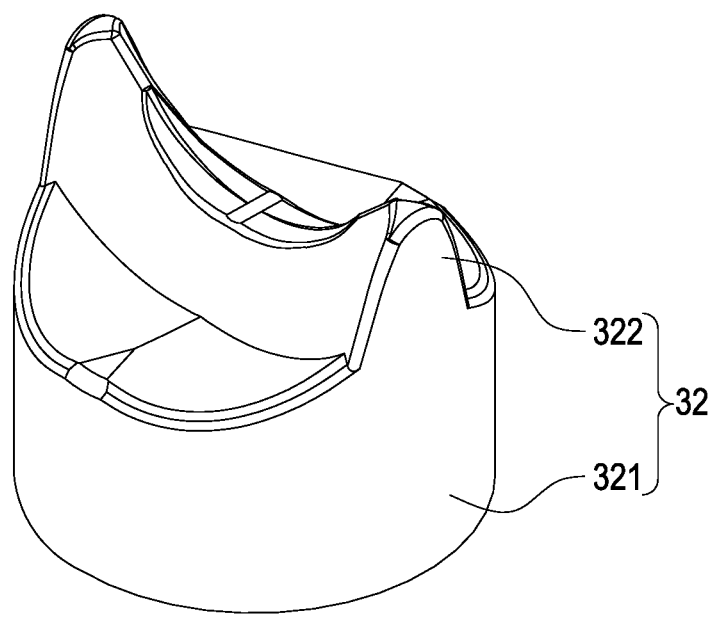
FIG. 9 is a perspective view of a crescent member of this disclosure.

The moving mechanism 30 comprises a moving rod 31 and a crescent member 32, and the moving rod 31 includes a block 311 and a rod 312 extended forwardly from the block 311, and an axial hole 313 is formed on a side of the block 311 and extended inside the rod 312, and a radial hole 314 is formed on the other side of the block 311 and communicated with the axial hole 313. The crescent member 32 includes a cylindrical body 321 and a crescent gear 322 formed at the upper part of the cylindrical body 321, wherein the upper part of the crescent gear 322 is substantially in the shape of a meniscus (as shown in FIG. 9). The moving rod 31 is sheathed on the rotary shaft 22 through the axial hole 313, and the crescent member 32 is accommodated in the radial hole 314 and embedded into the threaded portion 221 through the crescent gear 322.

In addition, the moving mechanism 30 of this preferred embodiment further comprises a sleeve 33, a ball 34 and a bottom plate 35, wherein the sleeve 33 is sheathed on the exterior of the ball 34 and the sleeve 33 together with the ball 34 are accommodated in the cylindrical body 321, so that the moving rod 31 can be moved more smoothly, and the bottom plate 35 is made of a wear-resistant material and covered onto the bottom of the block 311 at a position corresponsive to the crescent member 32.

Further, the reciprocating linear pushrod of this disclosure further comprises an electrical component 40 sheathed on the rotary shaft 22 and disposed between the first worm gear 224 and the block 311 of the moving rod 31, and the electrical component 40 comprises an adapter plate 41 and a touch home switch 42 electrically coupled to the adapter plate 41, and the rotary shaft 22 is installed to the adapter plate 41 through a front bearing 25, and the adapter plate 41 is provided for supporting and carrying the rotary shaft 22 to ensure the stability of the operation of the rotary shaft 22. The touch home switch 42 is provided for controlling the position of the moving rod 31 to ensure the final stop point of the moving rod 31.

Figure 5:
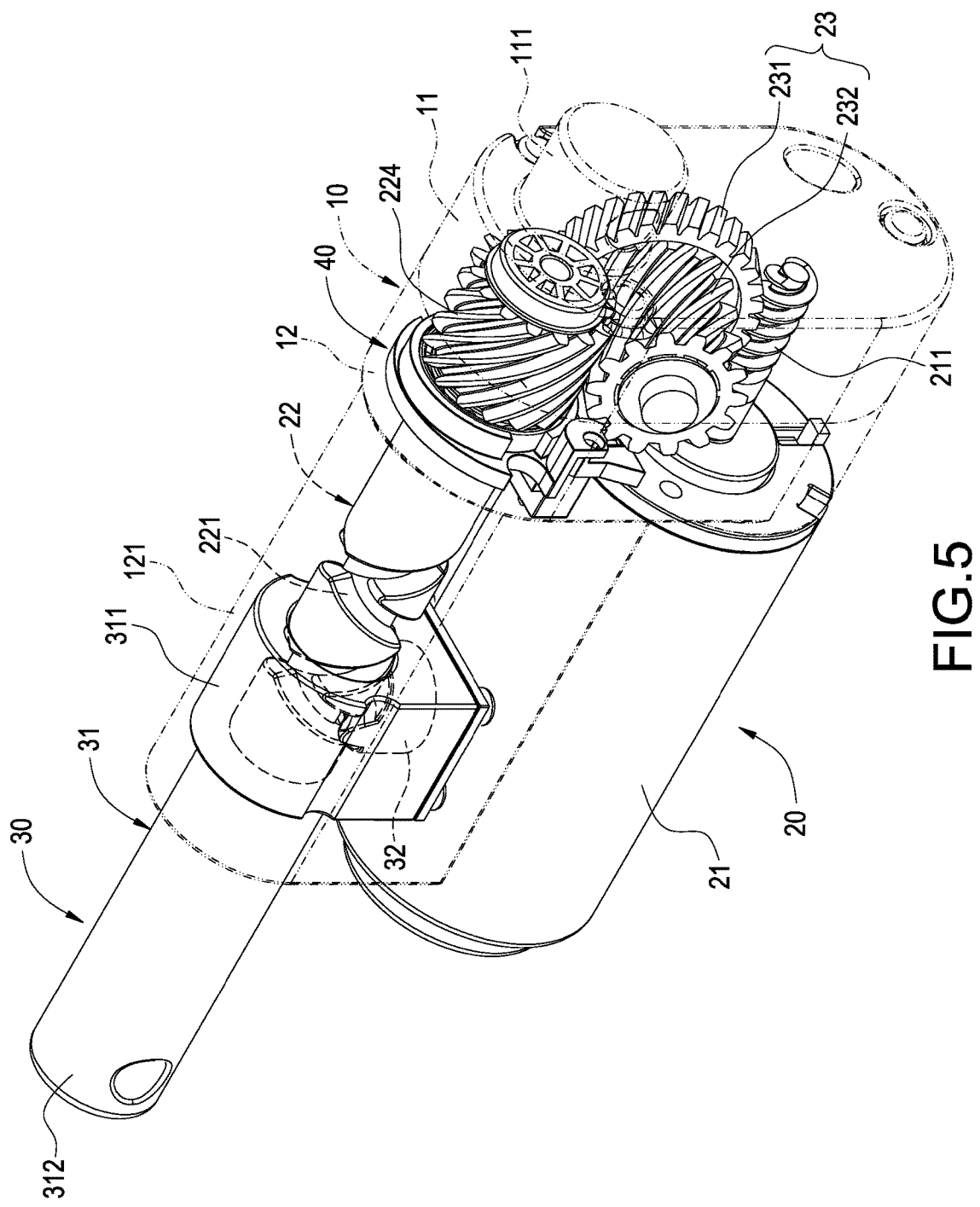
FIG. 5 is a schematic view of a using status of a reciprocating linear pushrod of this disclosure.
Figure 6:
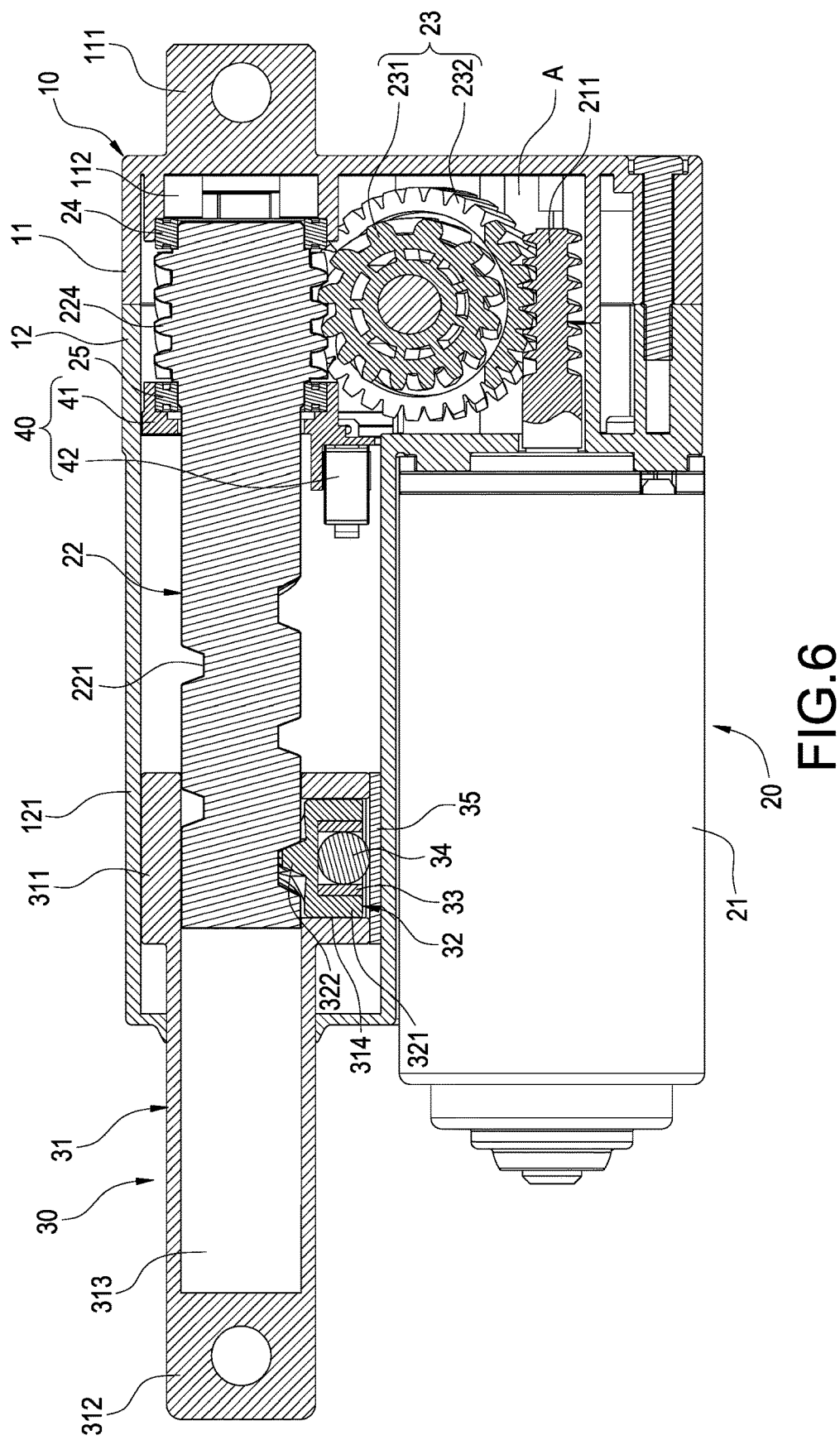
FIG. 6 is a cross-sectional view of a using status of a reciprocating linear pushrod of this disclosure.

In FIGS. 5 and 6, the worm 211 of the motor 21 is rotated in a single direction to drive the worm wheel 231 to rotate and drive the second worm gear 232 to rotate accordingly, so as to drive the first worm gear 224 and the rotary shaft 22 to rotate together. Now, the crescent gear 322 of the crescent member 32 is embedded into the left-handed thread groove 222 and provided for driving the moving mechanism 30 to move in a direction away from the rotary shaft 22, and allowing the moving rod 31 to extend progressively out from the hollow tube 121. After the crescent gear 322 is moved to an end position of the left-handed thread groove 222, the crescent gear 322 will be rotated with the rotary shaft 22 continuously and guided into the right-handed thread groove 223. Now, the moving mechanism 30 is moved in a direction towards the rotary shaft 22, so that the moving rod 31 is withdrawn gradually into the hollow tube 121. In this disclosure, the motor 21 can be rotated just in a single direction in order to drive the moving mechanism 30 to move reciprocally, instead of moving in forward and backward directions to achieve the back-and-forth movement, so that this disclosure improves the transmission performance and extends the service life.

Figure 7:
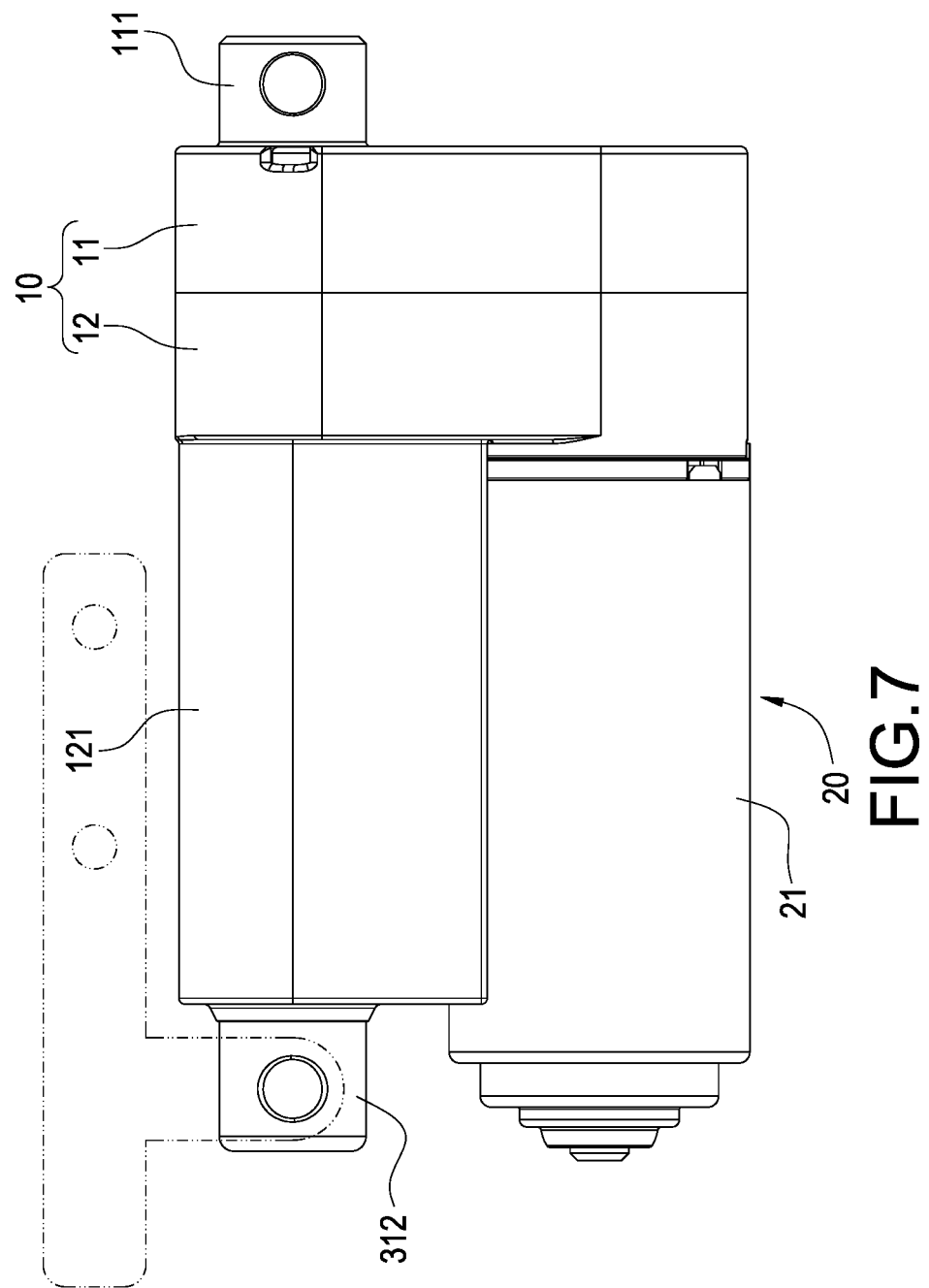
FIG. 7 is a schematic view of a reciprocating linear pushrod combined with a product in accordance with this disclosure.
Figure 8:
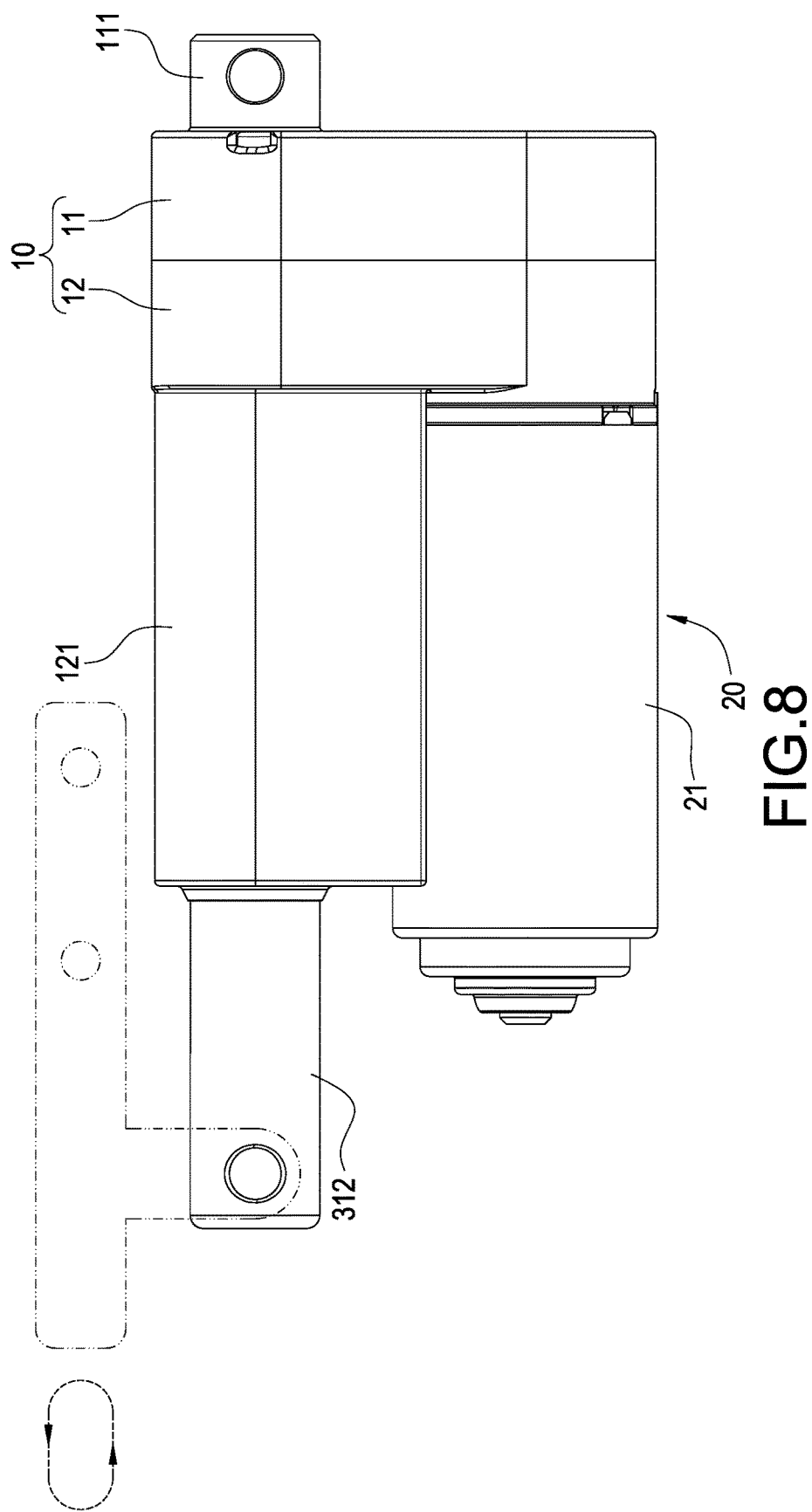
FIG. 8 is a schematic view of a using status of a reciprocating linear pushrod combined with a product in accordance with this disclosure.

In FIGS. 7 and 8, the reciprocating linear pushrod of this disclosure may be applied to the areas including advertising billboards, electric curtains, or windshield wipers, and the transmission relation can be achieved by combining a connector and a swing arm, and the conventional four-link-rod mechanism can be omitted to reduce the total volume and simplify the structure significantly.

In summation of the description above, this disclosure achieves the expected effects, overcomes the drawbacks of the prior art, and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A reciprocating linear pushrod, comprising: a base; a transmission mechanism, including a motor mounted onto the base, and a rotary shaft supported by the base and driven by the motor, and the rotary shaft having a threaded portion, and the threaded portion including a left-handed thread groove and a right-handed thread groove crossed with each other, and both ends of the left-handed thread groove communicating with both ends of the right-handed thread groove respectively; and a moving mechanism, including a moving rod and a crescent member, and the moving rod having an axial hole and a radial hole communicated to the axial hole, and the moving rod being sheathed on the rotary shaft by the axial hole, and the crescent member being accommodated in the radial hole and embedded in the threaded portion, so that the moving mechanism can be moved reciprocally according to the rotation of the rotary shaft, wherein the moving rod includes a block and a rod extended from the block, and the axial hole is formed on a side of the block and extended to the interior of the rod, and the radial hole is also formed at the block;

wherein the crescent member includes a cylindrical body and a crescent gear formed at cylindrical body, and the crescent member is embedded into the threaded portion by the crescent gear;

wherein the moving mechanism further includes a sleeve and a ball and the sleeve is sheathed on the exterior of the ball and the sleeve together with the ball are accommodated in the cylindrical body.

2. The reciprocating linear pushrod of claim 1, wherein the moving mechanism further includes a bottom plate covering the bottom of the block at a position corresponsive to the crescent member.

3. A reciprocating linear pushrod, comprising: a base; a transmission mechanism, including a motor mounted onto the base, and a rotary shaft supported by the base and driven by the motor, and the rotary shaft having a threaded portion, and the threaded portion including a left-handed thread groove and a right-handed thread groove crossed with each other, and both ends of the left-handed thread groove communicating with both ends of the right-handed thread groove respectively; a moving mechanism, including a moving rod and a crescent member, and the moving rod having an axial hole and a radial hole communicated to the axial hole, and the moving rod being sheathed on the rotary shaft by the axial hole, and the crescent member being accommodated in the radial hole and embedded in the threaded portion, so that the moving mechanism can be moved reciprocally according to the rotation of the rotary shaft; and an electrical component, and the rotary shaft having a first worm gear, and the moving rod including a block, and the electrical component being installed to the rotary shaft and disposed between the first worm gear and the block, wherein the electrical component includes an adapter plate, and the rotary shaft is installed to the adapter plate through a front bearing.

4. The reciprocating linear pushrod of claim 3, wherein the electrical component further includes a touch home switch electrically coupled to the adapter plate for controlling the position of the moving rod.

5. The reciprocating linear pushrod of claim 1, wherein the transmission mechanism further includes a gear set, and the motor has a worm extended therefrom, and the rotary shaft further includes a first worm gear, and the gear set is installed between the worm and the first worm gear.

6. The reciprocating linear pushrod of claim 5, wherein the gearset includes a worm wheel engaged and transmitted with the worm and coupled to the worm wheel, and a second worm gear engaged and transmitted with the first worm gear.

7. The reciprocating linear pushrod of claim 5, wherein the base includes a rear casing and a front casing engaged with the rear casing, and an accommodating chamber formed between the front casing and the rear casing, and the worm, the first worm gear and the gear set are accommodated in the accommodating chamber.

8. The reciprocating linear pushrod of claim 7, wherein the rear casing has a supporting seat and a bearing seat, and the supporting seat is formed outside the rear casing, and the bearing seat is formed in the accommodating chamber and configured to be corresponsive to the supporting seat, and an end of the rotary shaft is supported in the bearing seat through a rear bearing.

\* \* \* \* \*